United States Patent
Ngo

(10) Patent No.: US 7,170,861 B2
(45) Date of Patent: Jan. 30, 2007

(54) DISTRIBUTED DEVICE IDENTIFIER NUMBERING AND TOTAL DEVICE COUNTING ALGORITHM WITH SMART TIME DIVISION MULTIPLEXED SERIAL PORT

(75) Inventor: Scott-Thanh D. Ngo, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1014 days.

(21) Appl. No.: 09/918,967

(22) Filed: Jul. 31, 2001

(65) Prior Publication Data

US 2003/0026296 A1 Feb. 6, 2003

(51) Int. Cl.
*H04L 12/28* (2006.01)
*H04L 12/26* (2006.01)
*G06F 11/00* (2006.01)
*H03K 21/00* (2006.01)
*H03K 23/00* (2006.01)

(52) U.S. Cl. .................. 370/254; 370/241; 377/27
(58) Field of Classification Search .............. 370/254, 370/431, 464, 442, 458, 241; 713/500, 502; 700/94; 377/27
See application file for complete search history.

(56) References Cited

U.S. PATENT DOCUMENTS

| | | | | |
|---|---|---|---|---|
| 3,995,105 A | * | 11/1976 | Krivosheev et al. | ......... 348/193 |
| 2002/0083161 A1 | * | 6/2002 | Miyauchi | ................... 709/223 |
| 2002/0126574 A1 | * | 9/2002 | Downey et al. | ............. 367/14 |
| 2003/0204657 A1 | * | 10/2003 | Lehwalder et al. | ......... 710/301 |
| 2004/0179511 A1 | * | 9/2004 | Kizu et al. | ................... 370/350 |

OTHER PUBLICATIONS

INTEL; Audio Codec '97; Sep. 2000; pp. 1-105; Revision 2.2.

* cited by examiner

*Primary Examiner*—Kevin C. Harper
(74) *Attorney, Agent, or Firm*—Robert D. Marshall, Jr.; W. James Brady; Frederick J. Telecky, Jr.

(57) ABSTRACT

A distributed method and apparatus for assigning a unique identifier number to devices connected in a sequential fashion and determining a total device count is presented. Additionally, a method and apparatus for enabling the support of a variable number and type of time slots within a time division multiplexed serial protocol is presented.

13 Claims, 7 Drawing Sheets

DISTRIBUTED DEVICE IDENTIFIER NUMBERING AND TOTAL DEVICE COUNTING ALGORITHM WITH SMART TIME DIVISION MULTIPLEXED SERIAL PORT

FIELD OF THE INVENTION

This invention relates generally to digital communications and particularly to time division multiplexed communications channels for sharing a single communications link amongst multiple communicating devices.

BACKGROUND OF THE INVENTION

Time division multiplexing (TDM) has been used as a protocol for serial interface with coders/decoders (codecs) for an extended period of time. In a TDM system, each device (in this case, each codec) connected to the system is assigned a particular time slot within a frame through which it communicates and exchanges data with a controller. The arrangement of the time slots in the frame is called a frame structure. An advantage for using TDM is that a single serial connection can be shared among several codecs, negating the need to provide a separate connection between each of the codecs and the controller. Another advantage of TDM is its relative ease of implementation. Techniques such as frequency division multiplexing (FDM) and code division multiplexing (CDM) are more complex than TDM and require greater amounts of hardware and software to implement.

However, current implementations of TDM protocols for serial interfacing between codecs and the controller are quite inflexible. By its very nature, TDM is very rigid. A time slot is typically assigned to a codec and the codec can only communicate during its assigned time slot. Changes to the total number of codecs used in the system would necessitate a change in the design of the TDM system because the TDM frame structure would require modification to support the larger (or smaller) number of codecs. In many systems, when the number of codecs in the system is reduced, then the time slots previously assigned to those codecs remain in the system (but will be idle) although they are no longer being used. This leads to wasting a significant amount of the available bandwidth in the serial connection.

An additional disadvantage due to the inflexibility of the typical TDM implementation is that the actual frame structure itself cannot be modified in order to provide greater bandwidth depending upon application requirements. For example, a typical TDM frame structure includes both data slots and control slots. The data slots are used to transmit data while the control slots are used to transmit control and program information. However, there are applications that require a continuous stream of data. The presence of the control slot results in additional overhead for the controller due to the need to service the commands in the control slots.

Another requirement of a TDM system is that every codec in the system be assigned a unique identifier, usually, a unique number. Each codec requires a unique identifier because the controller must be able to address individual codecs. In TDM systems where the number of codecs and time slots do not change, i.e., static systems, techniques used in the assignment of the unique identifiers have included physical address pins and software routines to write and store device identifiers for each device. The use of physical address pins makes the TDM system even more inflexible due to the physical pins while software routines consume valuable processing power because address translation is required each time a codec is addressed.

A need has therefore arisen for a TDM system that provides flexibility in the number of codecs supported, increase bandwidth usage, and a simple way to assign codec addresses without requiring additional hardware or software support.

SUMMARY OF THE INVENTION

In one aspect, the present invention provides a method for distributed device identifier number assignment and device counting in a serially connected chain of said devices, comprising receiving a first sequence of received pulses and determining a unique device identifier based upon the first sequence received of pulses, transmitting a first sequence of transmitted pulses, receiving a second sequence of received pulses and transmitting a second sequence of transmitted pulses, and determining a total device count based upon said first and second sequences of received pulses.

In another aspect, the present invention provides a method for providing a variable number of time slots within a synchronization period in a system with at least one codec comprising determining a number of desired time slots, programming a programmable data clock driving the transmission of data within said time slots to a multiple of a timing clock driving said synchronization period, and configuring a delay for each codec proportional to a number of time slots assigned to each codec.

The present invention has a principal advantage in that it assigns unique device identifiers for all codecs connected to a controller via a serial interface by using a distributed algorithm that does not require any additional hardware pins or software translation programs which would result in additional overhead.

Another advantage of the present invention is that it can dynamically change the frame structure and time slot count of the frame depending upon the number of codecs connected to the controller. The present invention does not require that any hardware be modified in order to make changes to the frame structure.

Yet another advantage of the present invention is that the present invention can support different communications modes between the codecs and the controller, depending upon the current requirements of the system.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Time division multiplexing (TDM) is a commonly used technique to share a common resource between multiple devices. In the context of the present invention, TDM is used to allow multiple devices, such as coders/decoders (codecs), to share a single serial connection between the codecs and a controller. TDM is preferred over other multiplexing techniques because it is simpler and therefore requires a smaller amount of hardware and software to implement. However, the vast majority of TDM implementations have been static, i.e., they do not support a variable number of devices, and changes to the number of devices supported must be made to the hardware and the software supporting the TDM implementation.

Figure 1:
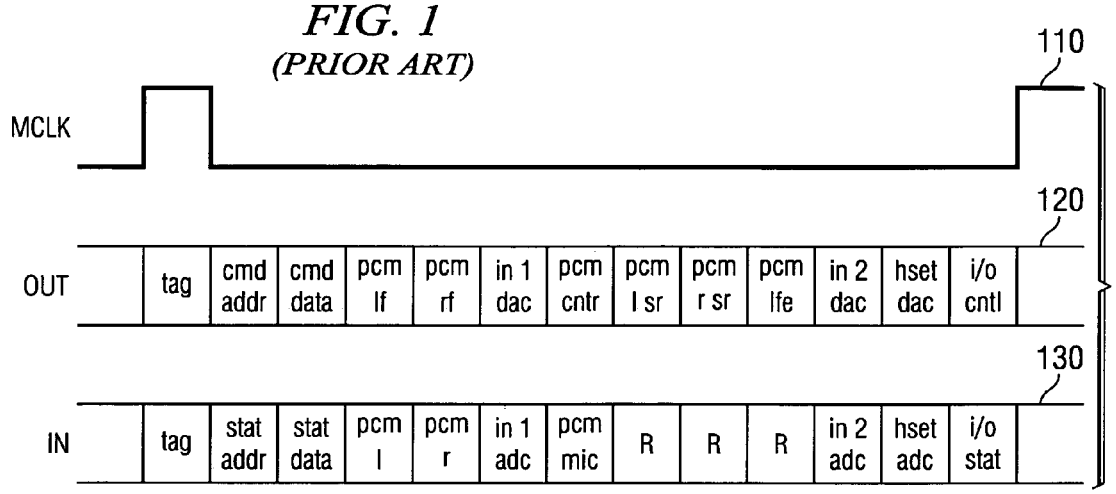
FIG. 1 illustrates a frame structure diagram for a well-known time division multiplex codec serial interface protocol.

Referring now to FIG. 1, a diagram illustrating a frame structure of a time division multiplex codec serial interface protocol as specified in the Audio Codec '97 technical specifications, revision 2.2, September 2000, and is displayed as FIG. 9 from said specifications, which is incorporated herein by reference. In the TDM system, there is a frame synch that is used to provide a constant time base for all devices in the system. A timing trace 110 displays the behavior of the frame synch, which remains low except when it periodically generates a synchronization pulse. These synchronization pulses are sometimes referred to as frame synchronization pulses and mark the end of one frame and the beginning of another.

A second timing trace 120 displays a frame structure for communications from the controller to the codec while a third timing trace 130 displays a frame structure for communications from the codec to the controller. The two timing traces (120 and 130) each display a frame structure of 12 time slots, with each time slot being assigned to a different function or codec. For illustrative purposes, each time slot is displayed as a rectangular block. For example, in trace 120, there are time slots assigned to carry command instructions and command data (tag, cmd addr, cmd data, i/o cntl, stat addr, stat data, i/o stat), pulse code modulated audio (pcm lf, pcm rf, pcm cntr, pcm l sr, pcm r sr, pcm lfe, pcm l, pcm r, pcm mic), modem data (In 1 dac, In 2 dac, hset dac, In 1 adc, In 2 adc, and hset adc) and several time slots reserved (R). The timing traces 120 and 130 display an exemplary frame structure for a system using TDM to share a single serial communications channel among multiple codecs.

Figure 2:
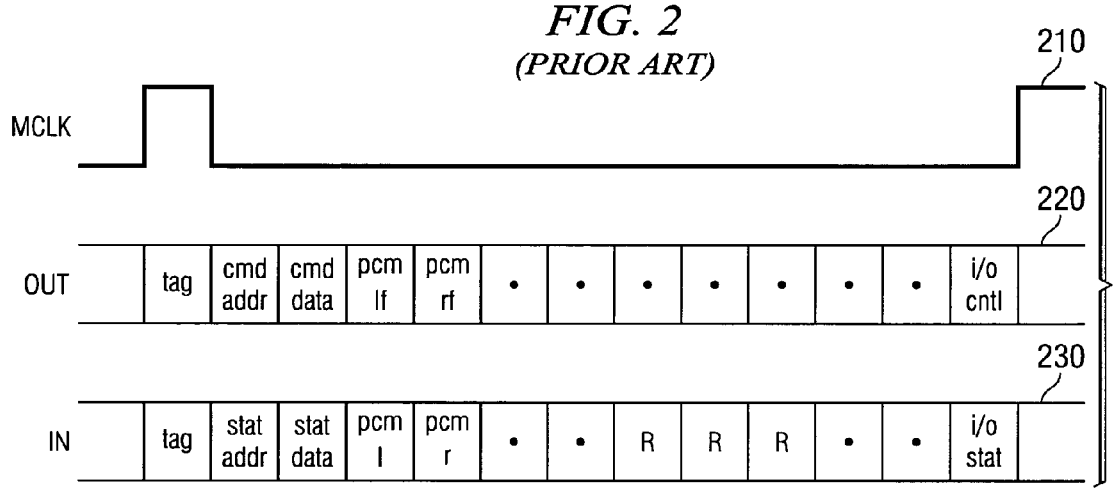
FIG. 2 illustrates a frame structure diagram for the well-known time division multiplex codec serial interface protocol as illustrated in FIG. 1 with several codecs idle or not present.

Referring now to FIG. 2, a diagram illustrating a frame structure of the AC '97 time division multiplex codec serial interface protocol as illustrated in FIG. 1 with several codecs not present. A timing trace 210 displays the behavior of a master clock while timing traces 220 and 230 display the frame structures of incoming and outgoing serial data. In the TDM system displayed in FIG. 2, several of the time slots are idle. These time slots are idle because the codecs are not present in the system. In a rigidly defined implementation of a TDM system, even if some codecs are not present in the system, the time slots reserved for them cannot be removed or reused and no data is transmitted during the time slots. The idle time slots waste available bandwidth.

Figure 3:
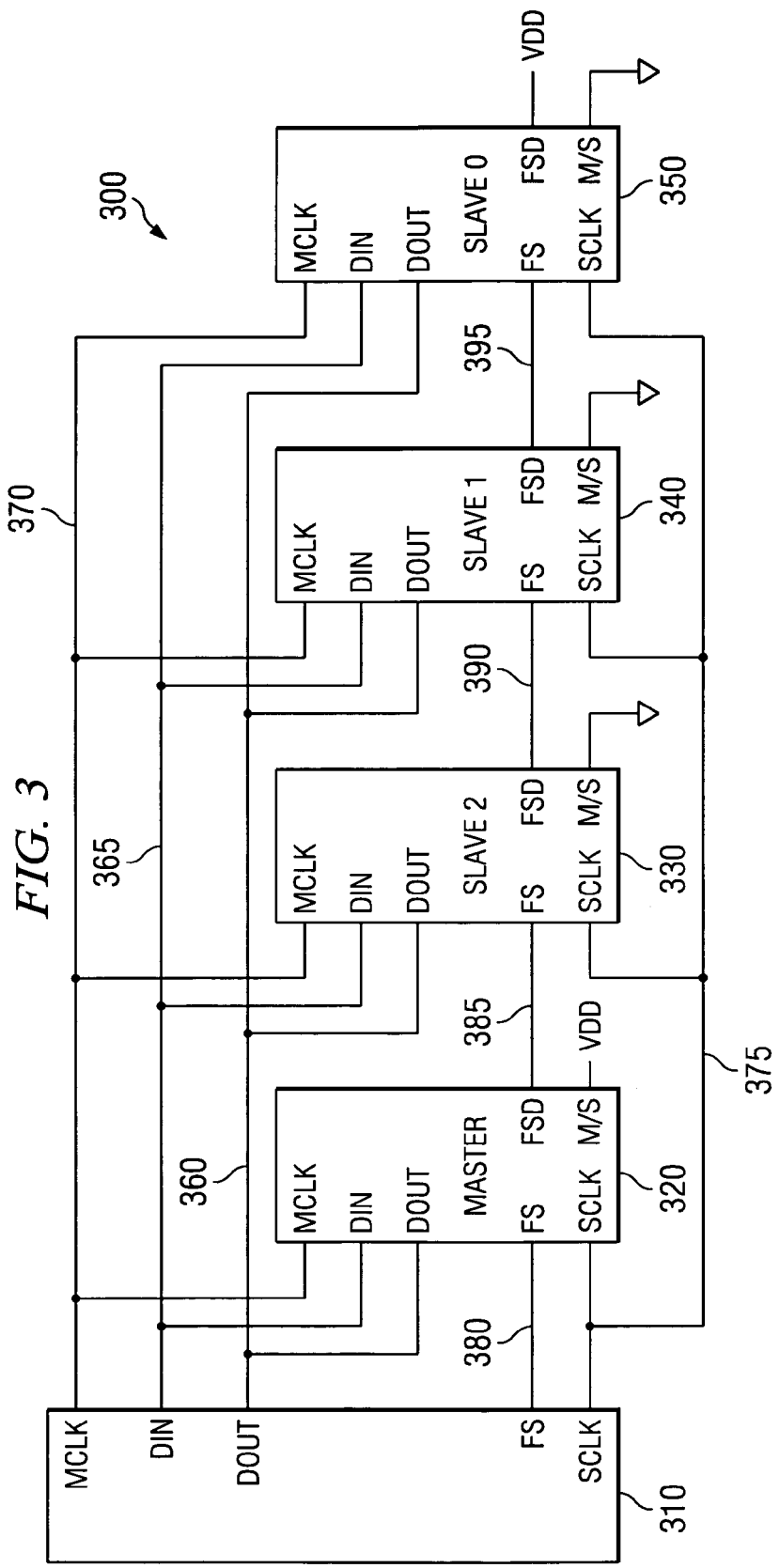
FIG. 3 is a block diagram illustrating several codecs and a digital signal processor configured according to a preferred embodiment of the present invention.

Referring now to FIG. 3, a block diagram illustrating several codecs and a digital signal processor in a TDM system 300, configured according to a preferred embodiment of the present invention. A digital signal processor (DSP) 310, such as a Texas Instruments TMS320C54X, is coupled to at least one codec. An example of a codec is a Texas Instruments TLV320AIC12, which is a low-power voice band codec. Other codecs are applicable to the present invention. For illustrative purposes, the present invention uses a TDM system with voice band codecs. However, the present invention is not limited to using voice band codecs and should not be construed as being so limited.

FIG. 3 displays an exemplary system where the DSP 310 is connected to four codecs (320, 330, 340, and 350). The codecs are serially connected in a master-slave codec configuration, where one of the codecs (320) is the master codec and the remaining three codecs (330, 340, and 350) are slaves. This serially connected chain of codecs is sometimes referred to as a cascade of codecs. According to the present invention, other codec configurations are supported. Other supported configurations include stand-alone master and stand-alone slave. In stand-alone master, there is one codec in the system and it is operating as a master codec. In stand-alone slave, there is one codec in the system and it is operating as a slave codec. The function of master and slave codecs are well understood by persons of ordinary skill in the art of the present invention.

In a system with a single codec, configured either as a stand-alone master or a stand-alone slave, it is convenient to maintain the idea of the codec chain. Therefore, in a single codec configuration (either stand-alone master or slave), the single codec will simultaneously be considered a first codec and a final codec. Accordingly, the algorithms discussed in this specification will function correctly with any number of codecs, be it one, two, or a number equal to the maximum number of codecs allowed in the system.

Each codec in the system 300 shares several connections with other codecs in the system 300. The shared connections include a system clock 370, a data-in (carrying data from the DSP 310 to the codecs) 365, a data-out (carrying data from the codecs to the DSP 310) 360, and a bit clock (providing data shifting time reference) 375. These connections form a serial interface that permits the codecs to communicate with the DSP 310 via a single communications link that is shared by the multiple codecs.

The system clock connection 370 distributes the master clock of the system 300 and is used to provide a single, stable time base for all devices in the system 300. The system clock is also used, by the individual devices to derive clocks that are internal to the DSP 310 and the codecs. For example, the system clock is used to derive internal clocks for analog interface circuitry for the codecs.

The data-in connection 365 carries data from the DSP 310 to the codecs. Information and data from the DSP 310 to the codecs are transmitted over the data-in connection 365. Every codec in the system 300 is assigned a different time slot and the codec will only expect to receive information during its assigned time slot. So, according to a preferred embodiment of the present invention, if the DSP 310 has information that it needs to send to a particular codec, it can only do so during the particular time slot assigned to the codec.

The data-out connection 360 carries data from the codecs to the DSP 310. Once again, each codec is assigned a different time slot to prevent transmission collisions. According to a preferred embodiment of the present invention, a codes can only communicate with the DSP 310 during its assigned time slot. Multiple codecs trying to transmit data during the same time slot would result in corrupted data within the time slot.

According to another preferred embodiment of the present invention, each codec can be assigned multiple time slots. This is advantageous if a particular codec has high bandwidth requirements that a single time slot is not capable of providing. Therefore, instead of providing (consuming) an insufficient amount of information to (from) the codec, multiple time slots can be assigned to increase available bandwidth.

The bit clock connection 375, sometimes known as the shift clock connection, is used provide a bit clock to the codecs to clock serial data into (via the data-in connection 365) or out of (via the data-out connection 370) the DSP 310. According to a preferred embodiment of the present invention, the bit clock runs at a rate that is sufficient to shift all data capable of being transmitted in a single frame during that single frame.

The master codec 320 generates a frame synchronization (FS) signal that is used to denote the end of one frame and the beginning of another frame. In applications without a master codec, e.g., the stand-alone slave codec configuration, the DSP 310 generates the frame synchronization signal. According to a preferred embodiment of the present invention, the frequency of the FS signal is equal to the frequency of the frames. According to another preferred embodiment of the present invention, the frequency of the FS signal is 8 KHz, which is the frequency of voice communication data samples in a plain old telephone system (POTS). A signal with a frequency of 8 KHz has a period of 125 milliseconds. Therefore, each frame in the system is 125 milliseconds in duration.

Each codec has its own version of the FS signal that it uses to denote when the codec can transmit or receive data. Since each codes transmits and receives at different times within a frame, a single FS is not sufficient to provide timing information for all of the codecs. According to a preferred embodiment of the present invention, a particular codec's FS signal is a delayed version of the FS signal of the codec immediately prior to it in the codec chain, as will be discussed below with respect to FIG. 4.

According to a preferred embodiment of the present invention, the master codec 320 generates an FS signal that it itself uses as the frame synchronization. The FS signal generated by the master codec 320 can also be considered as the master FS signal for the entire system 300.

In addition to transmitting (or receiving) information, the master codec 320 also produces a delayed version of the FS signal. According to a preferred embodiment of the present invention, the delay that the master codec 320 places onto the FS signal is equal to the duration of a single time slot. The delayed FS signal, referred to as a FSD signal, is transmitted to the next codec in the codec chain. The delayed FS signal (the FSD signal) as received by the next codec in the codec chain becomes the FS signal for that particular codec. This process continues for each codec in the system 300.

According to a preferred embodiment of the present invention, in a system with a master-slave codec configuration, i.e., a system with more than one codec, the master codec and the final slave codec are specially marked. Each codec in the system has a control pin called the master/slave pin. If the codec is a master, then the master/slave control pin is held high and if the codec is a slave, then the master/slave control pin is held low. The final slave in the master-slave codec configuration is so marked by holding its FSD signal output high. It should be readily evident to a person of ordinary skill in the art of the present invention that the present invention would operate equally effectively if the particular assignments of the master/slave control pins and the FSD signal output state were reversed.

Figure 4:
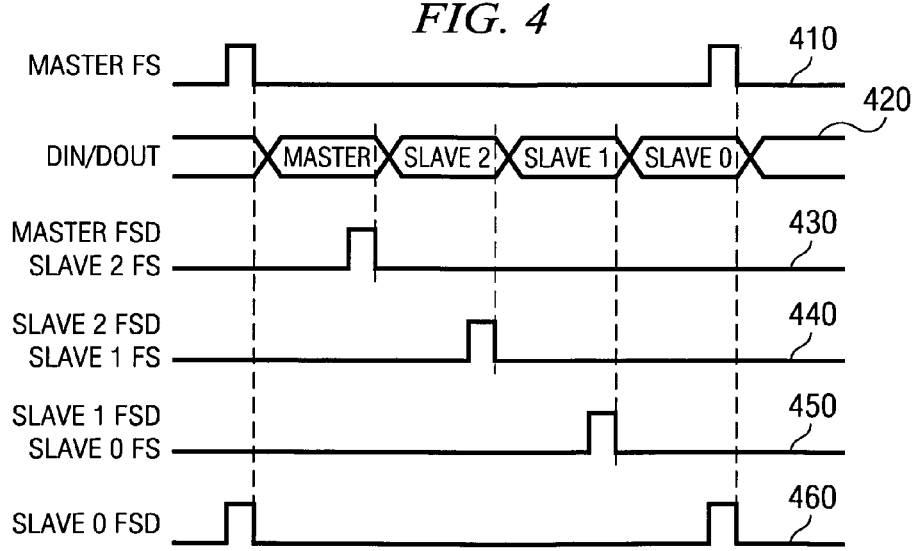
FIG. 4 is a timing diagram illustrating a timing relationship between several signals and data slots according to a preferred embodiment of the present invention.

Referring now to FIG. 4, a timing diagram illustrating the timing relationship between FS signals and time slots according to a preferred embodiment of the present invention. A first signal trace 410 displays the behavior of the master FS signal generated by the master codec 320. The first signal trace 410 displays two pulses of the master FS signal and according to a preferred embodiment of the present invention, the spacing between the two falling edges of the two pulses is the duration of a single frame. Alternative preferred embodiments of the present invention may use the rising edges of the master FS pulses or some time in between the rising and falling edges of the master FS pulses to denote the beginning and end of a frame.

A second signal trace 420 displays the time slots in either the data-in or the data-out signal lines of the DSP 310, which are tied to data-in and data-out of each codec in the system 300. According to a preferred embodiment of the present invention, both the data-in and the data-out signal lines have the same frame structure. While the data-in and the data-out signal lines have the same frame structure, the data carried on the two signal lines may be different. For an exemplary system displayed in FIG. 4, there are four codecs configured in a master-slave codec configuration. There are four time slots within a single frame and each time slot is assigned to a different codec. There is a single slot assigned to the master codec and three time slots assigned to slave codec 0, slave codec 1, and slave codec 2 respectively. This frame structure is repeated for every frame.

A third signal trace 430 displays a delayed FS signal as generated by the master codec. As discussed previously, according to a preferred embodiment of the present invention, each codec delays the FS signal that it receives (via its FS signal line) by a single time slot and then outputs it to the next codec via its FSD signal line. A fourth signal trace 440, fifth signal trace 450, and a sixth signal trace 460 displays the FS signal output for the remaining three codecs in the system. According to a preferred embodiment of the present invention, the FSD of codec 350, i.e., the final codec in the chain, is tied to a high voltage value. Therefore, the sixth signal trace 460 represents the FSD as generated by the codec 350 and not the actual signal that would be present on the FSD output from codec 350.

By having an independent FS signal at each codec, the independent FS signals may be used by the codecs as a beacon to let them know when their assigned time slot has arrived and that they should either listen to receive information or send any information that they have to send.

According to another preferred embodiment of the present invention, each codec within a system may be assigned a different number of time slots, e.g., one codec may be assigned one time slot while another codec may be assigned two time slots. The number of time slots assigned to any codec can be varied depending on bandwidth requirements of the particular codec. Accordingly, the delay imparted onto the FS signal by the codec that has been assigned more than one time slot must be equal to the duration of the multiple time slots. Therefore, if a codec has been assigned three time slots, then the FSD signal that the codec will produce will be equal to the FS signal that it received plus a delay equal to the three time slots.

A significant disadvantage of present TDM systems is the inflexibility in the frame structure provided by these systems. In a typical system, the frame structure is defined using hardware and the number of time slots per frame is fixed. Additionally, the type of information carried within the frame is also fixed, e.g., a frame may be configured to carry a certain amount of control/program information and certain amount of data and these amounts cannot be changed. In certain applications, it may be desirable to carry only data or only control/program information.

According to a preferred embodiment of the present invention, multiple frame structure modes including but not limited to a program mode, a data mode, and a turbo mode are supported. In program mode, control/program information shares bandwidth with data information. In data mode, only data information is transmitted. While in turbo mode, data and control/program information can be transmitted at a higher data rate and leaving idle time within a frame to allow for other uses.

Figure 5A:
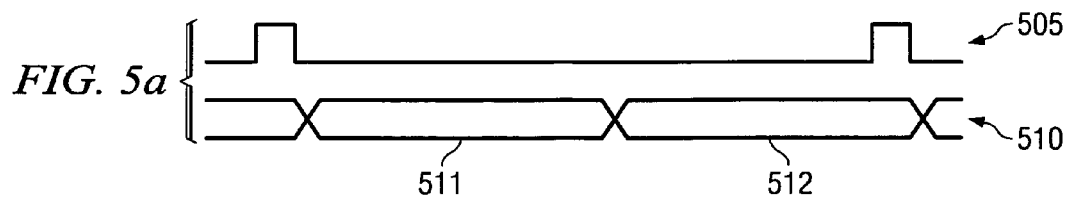
FIGS. 5a–f are timing diagrams illustrating several different frame structures supported by a serial interface protocol according to a preferred embodiment of the present invention.

Referring now to FIG. 5*a* for a timing diagram illustrating program mode for a single codec system. A first timing trace 505 displays the FS signal as produced by the master codec (stand-alone single master codec mode) or DSP 310 (stand-alone single slave mode). A second timing trace 510 displays the time slots in either the data-in or the data-out signal lines of the DSP 310. In program mode, there are two time slots for each codec in the system. A first time slot is a data time slot 511 that is used to transmit (receive) data information and a second time slot is a control slot 512 that is used to transmit (receive) control/program information. The data time slot 511 carries only data information between the codec and the DSP 310. The control slot 512 is used to control and/or program the codec and the DSP 310. According to a preferred embodiment of the present invention, the data slot 511 is transmitted first and is followed by the control slot 512. However, it should be clear to a person of ordinary skill in the art of the present invention that the relative positions of the control slot 512 and the data slot 511 can be swapped.

Figure 5B:
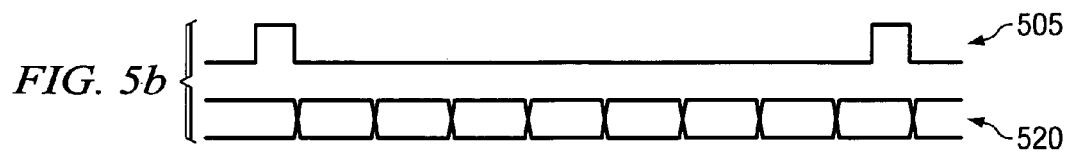

Referring now to FIG. 5*b*, a timing diagram illustrates the program mode for a four-codec system, with the codecs arranged in a master-slave codec configuration. A signal trace 520 displays the time slots in either the data-in or the data-out signal lines of the DSP 310. According to a preferred embodiment of the present invention, the data slots are transmitted before the control slots and they are transmitted contiguously, meaning that all data slots are transmitted prior to the control slots being transmitted. According to another preferred embodiment of the present invention, the data slots and the control slots can be transmitted in an interleaved fashion. In interleaving, the data slot and the control slot for a single codec are transmitted and then the data slot and the control slot for the next codec are transmitted and so on.

There are instances when no control/program information needs to be passed between the codecs and the DSP 310. In a pure data transfer mode, the presence of a control slot that is not being used would waste a significant portion of the available bandwidth of the serial communications channel. For example, in a single codec system, the presence of a control slot would waste 50% of the available bandwidth. An example of an application where a control slot is not needed is when the DSP 310 is using direct memory access (DMA) or is accessing an auto-buffering unit (ABU). When operating in this fashion, the DSP 310 requires a continuous stream of data to minimize the DSP's overhead that is the direct result of responding to control/program information carried in the control slot. Accordingly, the present invention can operate in a data mode where the only time slots in a frame are reserved for transmitting data.

Figure 5C:
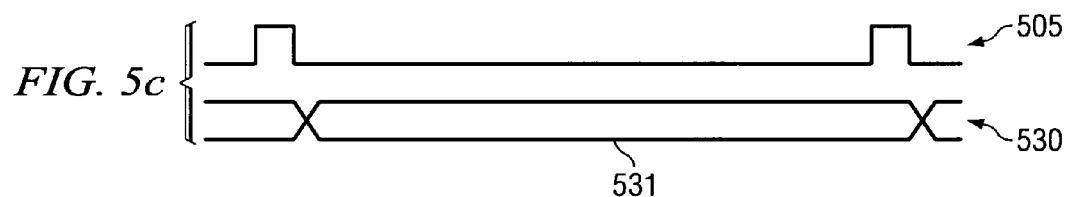

Referring now to FIG. 5*c*, a diagram illustrates data mode for a system with a single codec. The first signal trace 505 once again displays the FS signal as produced by the master codec (stand-alone single master codec mode) or DSP 310 (stand-alone single slave mode). A second signal trace 530 displays the time slots in either the data-in or the data-out signal lines of the DSP 310. Comparing the second signal trace 530 with the signal trace 510 from FIG. 5*a*, it is evident that the second signal trace 530 has only a single time slot 531 per frame and that time slot has been reserved for transmitting data.

Figure 5D:
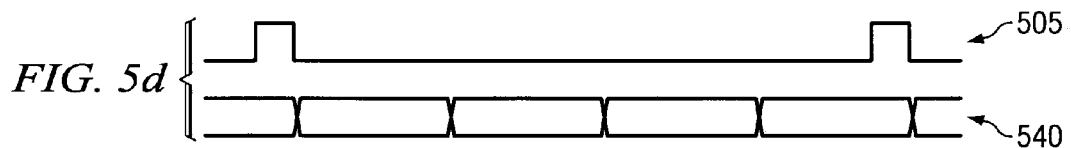

Referring now to FIG. 5*d*, a diagram illustrates data mode for a system with four codecs configured in a master-slave codec configuration. A signal trace 540 displays the time slots in either the data-in or the data-out signal line of the DSP 310. Once again, it is evident that there are only time slots for transmitting data between the codecs and the DSP 310, with each codec assigned to a single time slot.

Turbo mode provides a way to accelerate the transmission of data and control/program information within a single frame to permit the DSP 310 some idle time to perform other tasks. For example, if the transmission rate of the data and control/program information were doubled, then the information being transmitted would complete transmission in half of the time. By finishing the transmission in half of the time, the second half of the frame is idle and the DSP is free to perform other tasks because it is no longer required to receive/transmit data. According to a preferred embodiment of the present invention, turbo mode operates when the frames contain both data and control/program information (program mode). However, it should be clear to a person of ordinary skill in the art of the present invention to include a data transfer mode within turbo mode.

Figure 5E:
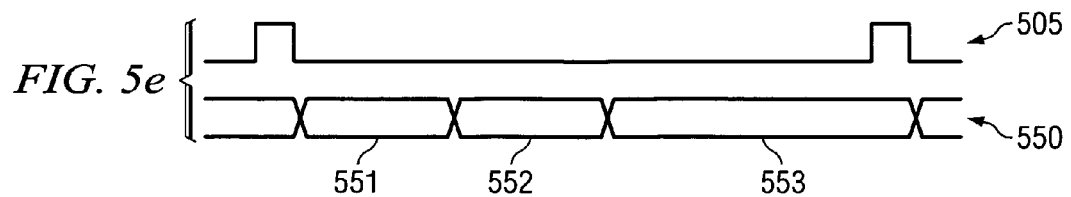

Referring to FIG. 5e, a diagram illustrates turbo mode for a system with a single codec. A signal trace 550 displays the time slots in either the data-in or the data-out signal line of the DSP 310. With the data transfer rate increased, a data slot 551 and a control slot 552 can be transmitted in less time than what is provided by the frame, therefore, there is some idle time 553 within the frame. Since the DSP 310 does not have to transmit or receive any information during this idle time 553, it is free to perform other tasks.

Figure 5F:
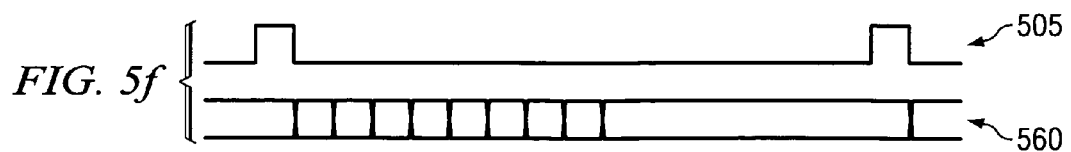

Referring to FIG. 5f, a diagram illustrates turbo mode for a system with four codecs in a master-slave codec configuration. A signal trace 560 displays the time slots in either the data-in or the data-out signal line of the DSP 310. Once again, with the transmission rate much higher than required, a significant amount of time is left idle within the frame.

According to a preferred embodiment of the present invention, a preferred technique used to provide a variable number of time slots and to provide accelerated transmission of information within a single frame is to use a data clock that can be programmed. With a fixed time slot size and a programmable data clock, one would only need to increase the data clock frequency to transmit a greater amount of information, hence a larger number of time slots or the same number of time slots in less time. For example, upon system power-up, a number of codecs present in the system is detected. The programmable data clock can be set to provide a sufficient information transfer rate to support a specified number of time slots for each codec present.

In order to support turbo mode, the programmable data clock must be able to operate at a frequency that is significantly higher than the minimum frequency required in order to transmit the data in less time. For example, in a system operating in program mode with an 8 KHz frame rate with four codecs and each time slot has 16 bits, the programmable data clock must be able to operate at:

data clock=8 KHz*4*2*16=1.024 MHz, where 8 KHz is the frame rate, 4 is the number of codecs, 2 is the number of time slots per codec, and 16 is the number of bits per time slot.

Therefore, to support turbo mode, the programmable data clock must operate at a frequency that is at least two to three time the normal data clock frequency, or 2.048 MHz or 3.072 MHz.

Figure 6A:
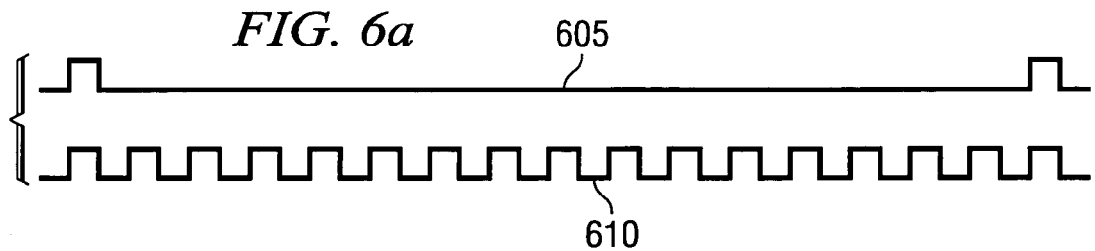
FIGS. 6a–b are timing diagrams illustrating timing relationships between a frame synchronization clock and a data clock.
Figure 6B:
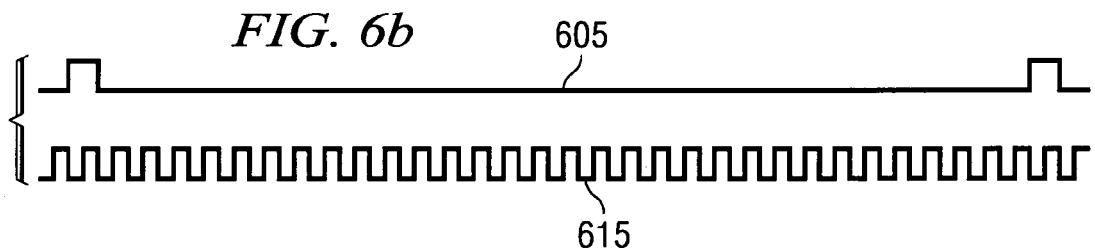

FIGS. 6a and 6b, timing diagrams illustrate timing relationships between the FS signal and the programmable data bit clock. FIG. 6a displays a signal trace 605 that displays a single period of the FS signal and a signal trace 610 of a programmable data bit clock that is set to operate at a rate that is suitable for a system with a single codec operating in data mode with 16 bits of data per time slot. If the system has an FS signal operating at 8 KHz, then the programmable data clock would need to be operating at 128 KHz (8 KHz*1 slot per frame*16 bits per slot). FIG. 6b displays a signal trace 615 that is set to operate at a rate that is suitable for a system with a single codec operating in program mode or a system with two codecs operating in data mode. If the system has an FS signal operating at 8 KHz, then the programmable data clock would be operating at 256 KHz (either 8 KHz*1 codec*2 slots per codec*16 bits per slot or 8 KHz*2 codecs*1 slot per codec*16 bits per slot).

In addition to having a programmable data bit clock, a system that supports a variable number of time slots will also require a way to accurately synchronize each of the codecs in the system to the proper time when they are required to send and receive information. According to a preferred embodiment of the present invention, each codec has a delay unit that is also programmable. Therefore, once the processor determines how many time slots are required per frame and how many time slots are assigned to each codec, it can go ahead and program the programmable delay unit in each codec with an appropriate delay amount.

The programmable delay unit within each codec may be as simple as a counter that is programmed to count a specified number of SCLK pulses. Once the counter has counted the prerequisite number of SCLK pulses, it generates the FSD pulse. The programmable delay unit may itself generate the FSD pulse or it may signal a separate device that is responsible for generating the FSD pulse to generate the pulse.

According to another preferred embodiment of the present invention, the programmable delay unit in each codec does not require to have the same amount of delay. By accepting a variable amount of delay, the system is able to assign a different number of time slots to each codec.

Figure 7:
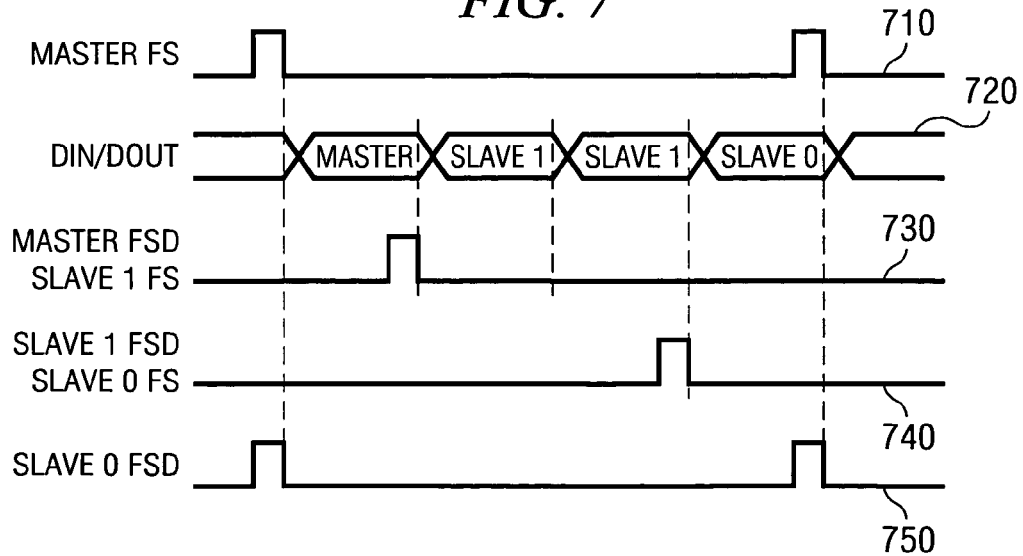
FIG. 7 is a timing diagram illustrating multiple time slots assigned to a single codec.

Referring now to FIG. 7, a diagram illustrates variable delays and the assignment of a different number of time slots to each codec in a system with three codecs arranged in a master-slave codec configuration. A first signal trace 710 displays a master FS signal and a second signal trace 720 displays the time slots in either the data-in or the data-out signal line of the DSP 310. A third signal trace 730 displays a FSD signal for the master codec. The master codec in this case has been assigned a single time slot and the delay between the FS signal and the FSD signal for the master codec is equal to one time slot in duration. A fourth signal trace 740 displays a FSD signal for the first slave codec. The first slave codec has been assigned two time slots and the delay between its FS signal and FSD signal is two time slots in duration. A final signal trace 750 displays the FSD signal for the second slave codec, which has been assigned a single time slot.

In order to dynamically reconfigure the frame structure, the system should be able to determine the number of codecs present in the system. Additionally, each codec should be assigned a unique identifier so that each codec may be individually addressed.

According to a preferred embodiment of the present invention, a host controller may be connected to the cascade of codecs via a host port interface (HPI). The connection of the host controller to the codec cascade allows simple programming of the codecs control registers. A preferred embodiment of the present invention uses a two-wire serial interface to implement the host port interface.

The host port operates in two different modes, a S2C mode and an 12C mode. The S2C (Start-Stop Communication) mode is a write-only interface and is used to program the control registers of the codec cascade. The 12C (Inter-IC Control) is an industry standard serial communications protocol. In both modes, individual device addresses are required so that the individual codecs can be addressed and their control registers read and/or programmed. Therefore, it is crucial to have the codecs assigned unique identifiers.

In a static system where the system cannot be changed, techniques using hardware pins and software translation programs to individually address codecs have been used. However, static techniques prevent the system from dynamically modifying the frame structure resulting in wasted bandwidth and the inability to add new codecs.

According to a preferred embodiment of the present invention, a distributed method is used for determining the number of codecs present within a system and for assigning a unique identifier to each of the codecs. Centralized methods for determining the number of codecs and assigning a unique identifier to each are available, but the distributed method requires a minimal amount of information interchange and is easy to implement with minimal hardware and software.

Figure 8:
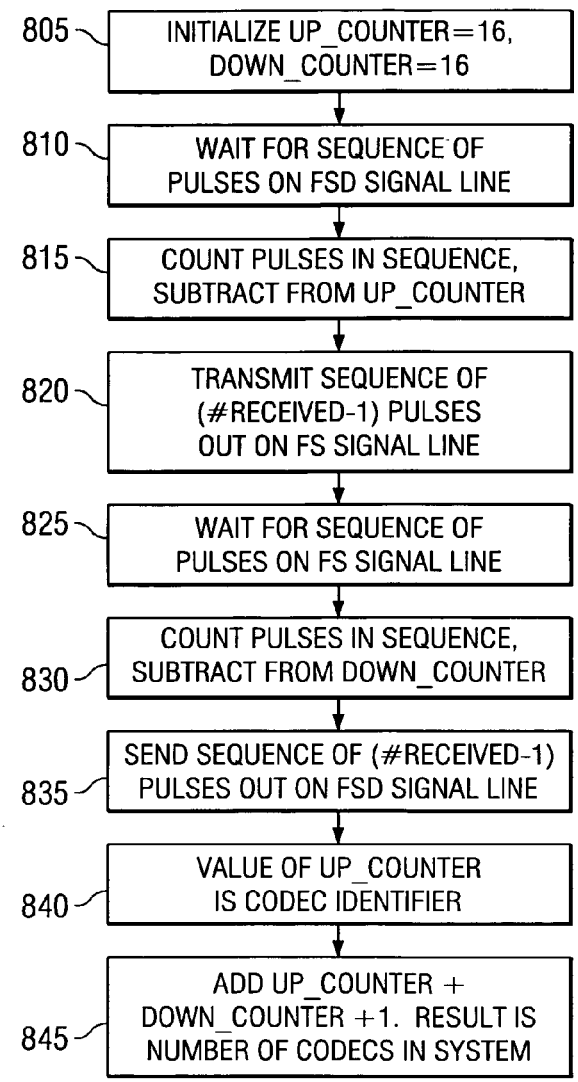
FIG. 8 is a block diagram illustrating a distributed algorithm for device identifier assignment and total device count according to a preferred embodiment of the present invention.

Referring now to FIG. 8, a block diagram illustrating a distributed algorithm for determining the number of codecs present within a system and for assigning a unique identifier to each codec in the system. The distributed algorithm, according to a preferred embodiment, requires only a counter and two storage locations for each codec. The counter and two storage locations may be in a microcontroller located inside the codec. As discussed previously, a codec knows if it is the final codec in the codec chain, the first codec in the codec chain, or an intermediate codec in the codec chain. According to a preferred embodiment of the present invention, the first codec in a codec chain has its master/slave control pin set to a high value, while the final codec in a codec chain has its FSD signal line tied to a high value. Knowledge of a codec's position in the codec chain is needed only to initiate the distributed algorithm. The same distributed algorithm executes on each of the codecs.

The distributed algorithm is initiated whenever the system is reset or when it is initially powered-up. When the system is reset or powered-up, the final codec in the codec chain detects that it is the final codec in the codec chain. The final codec also knows that the distributed algorithm needs to be executed because the system has just been reset. While the discussion below discusses the operation of the distributed algorithm executing on the final codec, the distributed algorithm operates in the same fashion on the other codecs in the codec chain.

The distributed algorithm begins by initializing two storage locations (block 805), the first storage location is called the up_counter and the second storage location is called the down_counter and both are initialized to a value equal to the maximum number of codecs allowed in the system. According to a preferred embodiment of the present invention, the maximum number of codecs in the system is 16. Other preferred embodiments may support a maximum number of 4, 8, or 32 codecs. After initializing the two storage locations, the distributed algorithm waits for the arrival of a first sequence of received pulses. According to a preferred embodiment of the present invention, the first sequence of received pulses arrives at the final codec through the FSD signal line.

While it was previously discussed that the FSD signal line of the final codec was tied to a high value, immediately after a system reset or a power-up, the FSD signal line is connected to a pulse generator. The change in the connection can be made through a switch, a tri-state device, a multiplexor, or some other similar device. The pulse generator is configured to generate a sequence of pulses after the system has been reset or powered-up. According to a preferred embodiment of the present invention, the pulse generator is configured to generate sequence of pulses that is equal to the maximum number of codecs in the codec chain. According to a preferred embodiment of the present invention, the maximum number of codecs in the codec chain is 16, so the pulse generator generates a sequence of 16 pulses.

After receiving the first received sequence of pulses (block 810), the distributed algorithm counts the number of pulses that were in the first received sequence of pulses. The distributed algorithm then subtracts this number from the value stored in the up_counter memory location (block 715). For the final codec, the value stored in the up_counter memory location will be equal to zero (16 minus 16).

The distributed algorithm is now ready to transmit a first sequence of pulses out the FS signal line to the next codec (block 820). The first transmitted sequence of pulses is equal to the length of the first received sequence of pulses minus one (in the case of the final codec, 15 pulses are transmitted). The relationship between the first transmitted sequence and the first received sequence is:

length(transmitted sequence)=length(received sequence)−1.

After transmitting the first transmitted sequence, the distributed algorithm waits for a second received sequence of pulses to arrive via the FS signal line (block 825). When the distributed algorithm receives the second received sequence of pulses, the distributed algorithm counts the number of pulses in the second received sequence of pulses. The distributed algorithm then subtracts this count from the value stored in the down_counter memory location (block 830).

The distributed algorithm is now ready to transmit a second sequence of pulses out the FSD signal line to the next codec (block 835). The second transmitted sequence of pulses is equal to the length of the second received sequence of pulses minus one. The relationship between the second transmitted sequence and the second received sequence is:

length(transmitted sequence)=length(received sequence)−1.

The distributed algorithm then calculates the unique device identifier (block 840) and the total codec count (block 845). The unique device identifier is equal to the value stored in the up_counter memory location while the total codec count is equal to the sum of the up_counter memory location plus the down_counter memory location plus one.

Because the distributed algorithm waits two different times for the arrival of two different pulse sequences, it is possible for the final codec to become deadlocked while the distributed algorithm is waiting for a sequence of pulses that does not arrive. According to a preferred embodiment of the present invention, the distributed algorithm is ensured of receiving a sequence of at least one pulse each time it waits for a sequence of pulses.

Figure 9A:
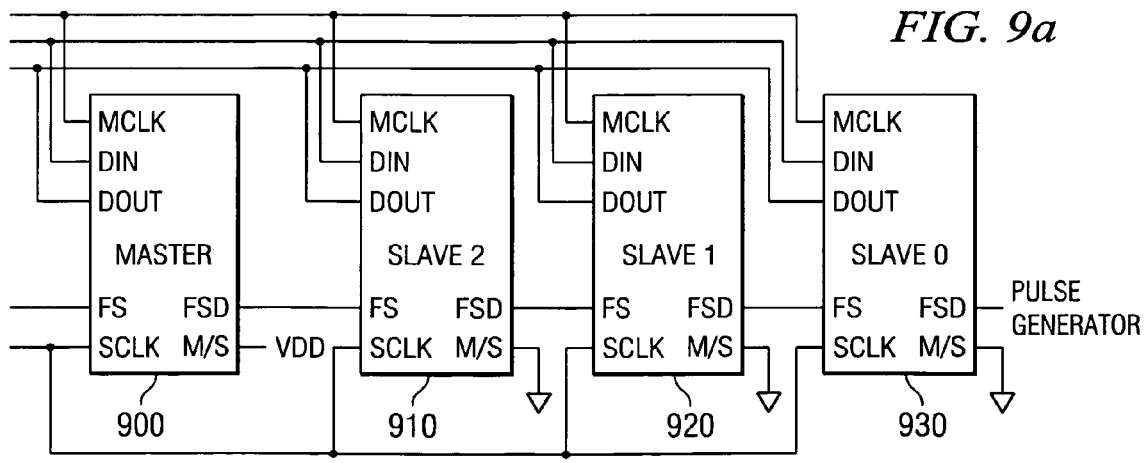
FIGS. 9a–c are block diagrams displaying data values used by the distributed algorithm for device identifier assignment and total device count according to a preferred embodiment of the present invention.
Figure 9B:
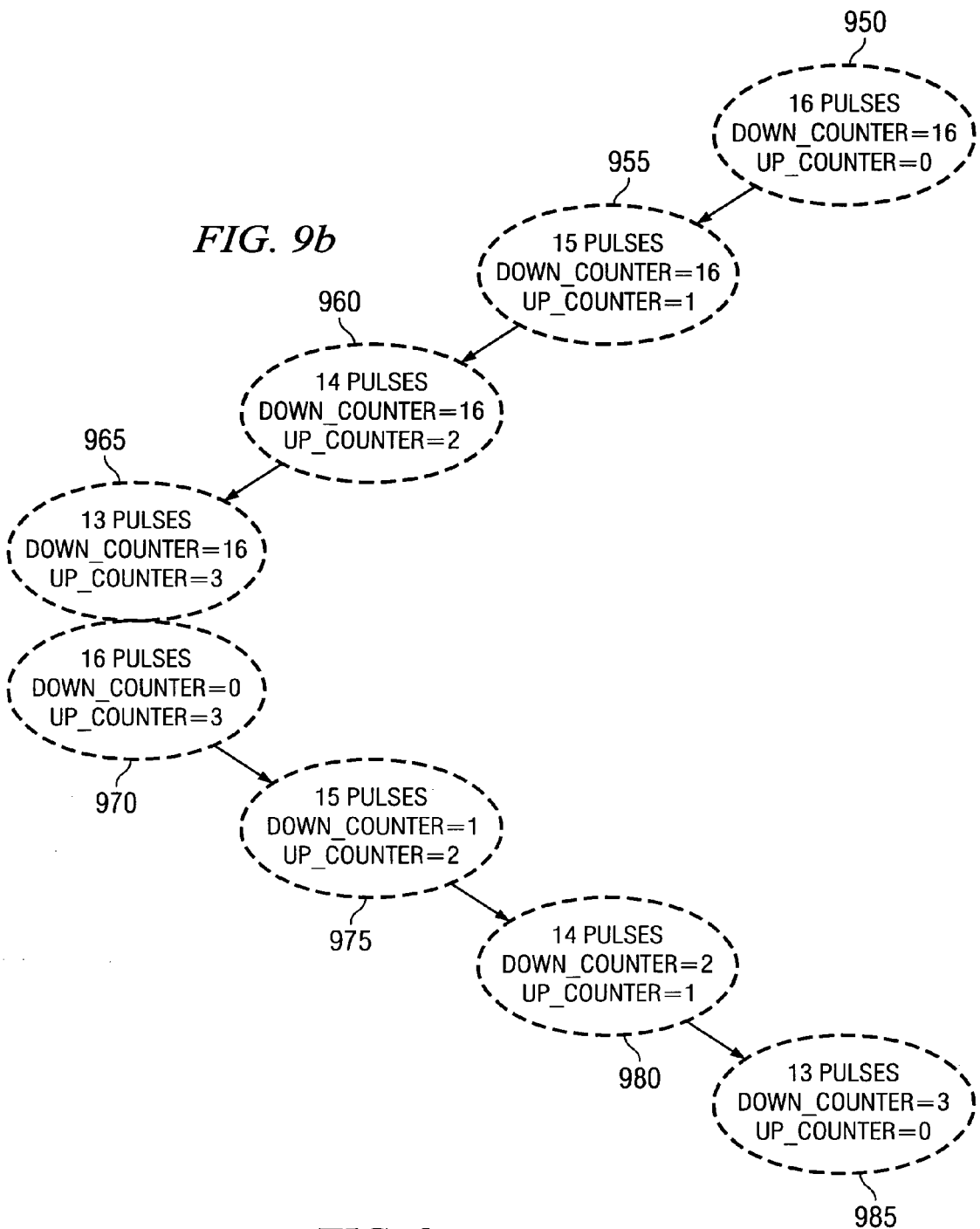
Figure 9C:
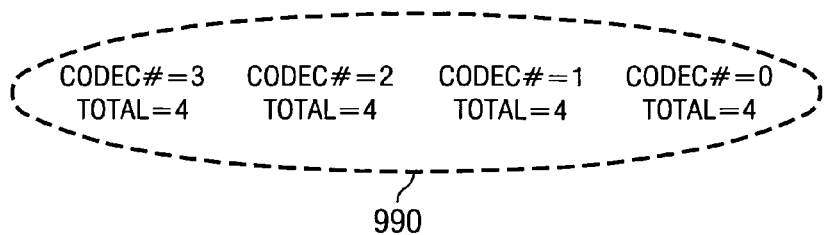

FIG. 9, which include FIGS. 9a, 9b, and 9c, block diagrams displaying data values used by the distributed algorithm for determining the number of codecs present within a system and for assigning a unique identifier to each codec according to a preferred embodiment of the present invention. An exemplary system with four codecs arranged in a master-slave codec configuration is displayed in FIG. 9a. A master codec 900 is connected to a first slave codec 910 which is in turn connected to a second slave codec 920 which is connected to a third slave codec 930.

When the exemplary system is reset or powered-up, the distributed algorithm is executed to assign unique identifiers to all of the codecs and to determine the total number of codecs in the system. According to a preferred embodiment of the present invention, the distributed algorithm begins in the final codec 930.

FIG. 9b illustrates a progression of highlighted areas (950 through 985) denote the values stored in the up_counter and down_counter memory locations as well as the number of pulses that the distributed algorithm receives from either the FSD or FS signal lines. FIG. 9c illustrates a final highlighted area 990, denotes the unique identifier assigned to each codec and the total number of codecs in the system as determined by the distributed algorithm executing on each codec.

As an example, for codec 920, after receiving the first sequence of received pulses (15 pulses in sequence) and transmitting the first sequence of transmitted pulses (14 pulses in sequence), the contents (shown in highlighted area 955) of the codec's memory locations are: up_counter=1 and down_counter=16. After receiving the second sequence of received pulses (14 pulses in sequence) and transmitting the second sequence of transmitted pulses (13 pulses in sequence), the contents (shown in highlighted area 980) of the codec's memory locations are: up_counter=1 and down_counter=2.

According to a preferred embodiment of the present invention, the codec 920 has the information to calculate its unique identifier and the total number of codecs in the system. The unique identifier for codec 920 is the value stored in the up_counter, 1. While the total number of codecs in the system is the sum of the two memory locations plus one, 1+2+1=4.

Figure 10A:
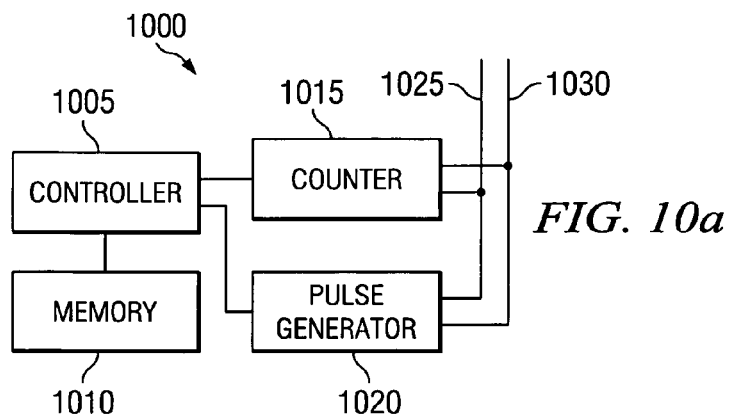
FIG. 10a is a block diagram of an interface to a codec providing support for device identifier assignment and total device counting according to a preferred embodiment of the present invention.

Referring now to FIG. 10*a*, a block diagram illustrates an interface 1000 to a codec providing support for device identifier assignment and total device counting according to a preferred embodiment of the present invention. According to a preferred embodiment of the present invention, the interface 1000 resides inside each codec in the system. However, it is possible that the interface be external to the codecs.

The interface 1000 has a controller 1005 that is responsible for controlling the operation of a counter 1015 and a pulse generator 1020, in general, the controller 1005 implements the distributed algorithm for device identifier assignment and total device count. The interface 1000 also has a memory that is used for storing values such as the number of pulses in a sequence, the unique device identifier, etc. The counter 1015 and the pulse generator 1020 are coupled to a pair of input/output nodes 1025 and 1030. The input/output nodes 1025 and 1030 are bidirectional nodes and their respective direction depends on the state of the codec.

As described previously, an incoming sequence of pulses arriving from one input/output node is received at the counter 1015 which provides counts of the number of pulses in the sequences to the controller 1005, which in-turn programs the pulse generator 1020 to generate a sequence of pulses which are transmitted out the other input/output node.

Figure 10B:
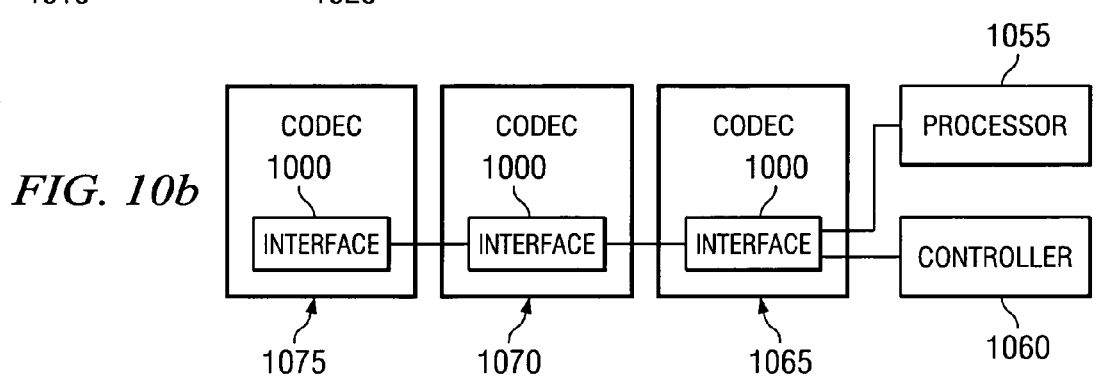
FIG. 10b is a block diagram of a system with an interface supporting device identifier assignment and total device counting according to a preferred embodiment of the present invention.

Referring now to FIG. 10*b*, a block diagram illustrates a system with an interface supporting device identifier assignment and total device counting according to a preferred embodiment of the present invention. The system is as described previously, a processor 1055 connected on a sequence of codec s 1065, 1070, and 1075. The system also features a controller 1060 that is used to control communications between the processor 1055 and the codecs and to program the codecs, among other things.

Each codec has an interface 1000 that is used to connect the codecs to the controller 1060 and the processor 1055. The interface 1000 also provides communications support for the codecs and the processor 1055 and the controller 1060. Internal to the interface 1000 is support for the distributed algorithm for device identifier assignment and total device count as described previously.

Figure 11A:
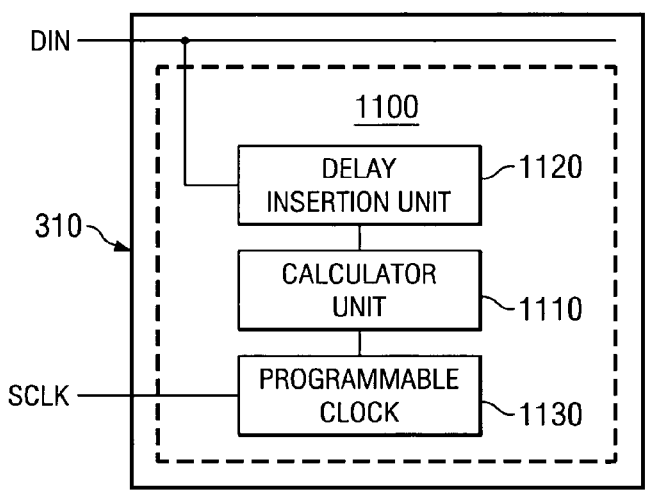
FIG. 11a is a block diagram of a device in a processor unit supporting a programmable data clock and a variable frame structure according to a preferred embodiment of the present invention.

Referring now to FIG. 11*a*, a block diagram illustrates a device 1100 in a processor unit supporting a programmable data clock and a variable frame structure according to a preferred embodiment of the present invention. Such a device 1100 may be located internal to a processor 310 that is in turn connected to a cascade of at least one codec or it may be an external add-on device that is coupled to the processor 310.

The processor 310 provides information to the device 1100 such as: how many time slots to assign to each codec (each codec may be assigned a different number of time slots) and the communications mode (either programming mode, data mode, or turbo mode). After receiving the information, a calculator unit 1110 performs necessary calculations to determine the operating frequency of the SCLK. For example, in a system with eight codecs operating in programming mode (one control slot and one data slot) with one time slot assigned per codec and each slot being 16 bits in size with a frame synchronization frequency of 8 KHz, the SCLK would have to operate at:

8 KHz*8 codecs*2 slots per codec*16 bits per slot=2.048 MHz.

After programming the programmable clock 1130, the calculator unit 1110 uses a delay insertion unit 1120 that is coupled to the DIN connection to insert delays into delay units of each codec. The delay insertion unit 1120 uses the DIN connection to program the delays into the delay units of the codecs. The device 1100 uses programming mode, which provides a data and a control slot for each codec to transmit the delay information.

Figure 11B:
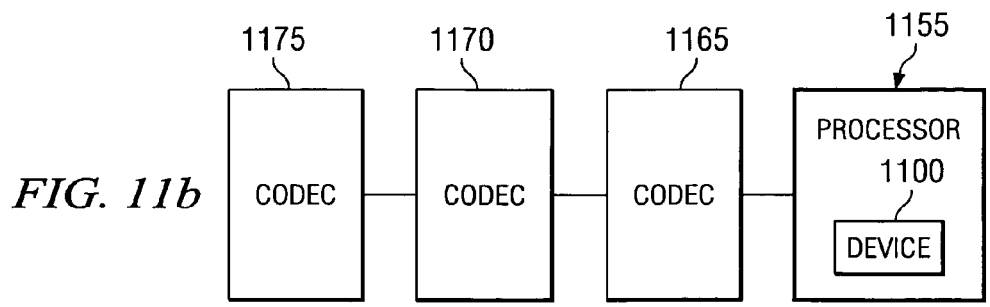
FIG. 11b is a block diagram of a system with a processor with support for a programmable data clock and a variable frame structure according to a preferred embodiment of the present invention.

Referring now to FIG. 11*b*, a block diagram illustrates a system with a processor with built-in support for a programmable data clock and a variable frame structure according to a preferred embodiment of the present invention. The system has a processor 1155 that is coupled to a set of codecs 1165, 1170, and 1175. The built-in support 1100 for a programmable data clock and a variable frame structure (discussed above) is displayed as being internal to the processor, but in alternative embodiments, the support may be in the form of an external device or a co-processor that attaches to the processor 1155.

According to a preferred embodiment of the present invention, turbo mode operates with a data clock rate that is two to three times faster than is necessary to transmit the data within the frame. According to another preferred embodiment of the present invention, turbo mode supports both program mode and data mode.

According to yet another preferred embodiment of the present invention, each codec in the system can be assigned a different number of time slots, with the assignment being based on bandwidth requirements of the particular codec. The variable number of time slots assigned per codec is supported by being able to vary the amount of delay inserted between a pulse arriving at a codec via the FS signal line and when the codec produces a corresponding pulse out the FSD signal line.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for distributed device identifier number assignment and device counting in a serially connected chain of devices, comprising:

initializing a first and a second memory locations both to a value that is equal to a maximum allowed number of devices in the serially connected chain;

receiving a first sequence of received pulses;

determining a unique device identifier based upon the first sequence received of pulses by counting a number of pulses in the first sequence of received pulses, and
subtracting the number of pulses from the value stored in the first memory location;
transmitting a first sequence of transmitted pulses;
receiving a second sequence of received pulses;
transmitting a second sequence of transmitted pulses; and
determining a total device count based upon the first and second sequences of received pulses.

2. The method of claim 1, wherein the unique device identifier is stored back to the first memory location.

3. A method for distributed device identifier number assignment and device counting in a serially connected chain of devices, comprising:
initializing a first and a second memory locations both to a value that is equal to a maximum allowed number of devices in the serially connected chain;
receiving a first sequence of received pulses;
determining a unique device identifier based upon the first sequence received of pulses;
transmitting a first sequence of transmitted pulses;
receiving a second sequence of received pulses;
transmitting a second sequence of transmitted pulses; and
determining a total device count based upon the first and second sequences of received pulses by
counting the number of pulses in the second sequence of received pulses;
subtracting the number of pulses from the value stored in the second memory location to obtain a difference; and
adding the value stored in the first memory location and the difference.

4. The method of claim 3, further comprising incrementing the result of adding the value stored in the first memory location and the difference by one (1.0).

5. A method for distributed device identifier number assignment and device counting in a serially connected chain of devices, comprising:
receiving a first sequence of received pulses;
determining a unique device identifier based upon the first sequence received of pulses;
transmitting a first sequence of transmitted pulses, the first sequence of transmitted pulses being a sequence of pulses with one pulse less than the number of pulses in the first sequence of received pulses;
receiving a second sequence of received pulses;
transmitting a second sequence of transmitted pulses; and
determining a total device count based upon the first and second sequences of received pulses.

6. A method for distributed device identifier number assignment and device counting in a serially connected chain of devices, comprising:
receiving a first sequence of received pulses;
determining a unique device identifier based upon the first sequence received of pulses;
transmitting a first sequence of transmitted pulses;
receiving a second sequence of received pulses;
transmitting a second sequence of transmitted pulses, the second sequence of transmitted pulses being a sequence of pulses with one pulse less than the number of pulses in the second sequence of received pulses; and
determining a total device count based upon the first and second sequences of received pulses.

7. A method for distributed device identifier number assignment and device counting in a serially connected chain of devices, comprising:
receiving a first sequence of received pulses;
determining a unique device identifier based upon the first sequence received of pulses;
transmitting a first sequence of transmitted pulses;
receiving a second sequence of received pulses;
transmitting a second sequence of transmitted pulses;
determining a total device count based upon the first and second sequences of received pulses; and
the steps of receiving first received sequence and transmitting second transmitted sequence are received and transmitted over the same input/output connection.

8. A system comprising:
a processor, coupled to a sequence of least one codec, adapted to processing digital data;
a controller, coupled to the sequence of at least one codec, adapted to controlling communications between the processor and the sequence of at least one codec;
the sequence of at least one codec, each codec comprising:
a port coupled to the processor and the controller; and
a semiconductor device for distributed device identifier number assignment and device counting coupled to the port, the semiconductor device comprising:
a counter, coupled to an input/output node, the counter for counting a number of pulses in a sequence of pulses received at the input/output node;
a first storage location to store a first count result; and
a pulse generator, for generating a specified length sequence of pulses, the specified length being one less than the number of pulses in the sequence of pulses received at the input/output node.

9. The system of claim 8, wherein the semiconductor device operates each time the system is reset.

10. The system of claim 8, wherein the semiconductor device operates each time the system is powered-up.

11. A system comprising:
a processor, coupled to a sequence of least one codec, adapted to processing digital data;
a controller, coupled to the sequence of at least one codec, adapted to controlling communications between the processor and the sequence of at least one codec;
the sequence of at least one codec, each codec comprising:
a port coupled to the processor and the controller; and
a semiconductor device for distributed device identifier number assignment and device counting coupled to the port; and
wherein a FSD signal line of a final codec in the sequence of at least one codec is connected to an external pulse generator.

12. The system of claim 11, wherein the semiconductor device operates each time the system is reset.

13. The system of claim 11, wherein the semiconductor device operates each time the system is powered-up.

* * * * *